United States Patent
Bruere

(10) Patent No.: US 10,556,748 B1
(45) Date of Patent: Feb. 11, 2020

(54) ROUND BOTTOM DRAG CONVEYOR PADDLE ASSEMBLY AND METHOD OF MAKING THE SAME

(71) Applicant: T.F. & J.H. BRAIME (HOLDINGS) P.L.C., Leeds (GB)

(72) Inventor: Roger Victor Bruere, Washington, IL (US)

(73) Assignee: T.F. & J.H. BRAIME (HOLDINGS) P.L.C., Leeds (GB)

( * ) Notice: Subject to any disclaimer, the term of this patent is extended or adjusted under 35 U.S.C. 154(b) by 0 days.

(21) Appl. No.: 16/100,123

(22) Filed: Aug. 9, 2018

(51) Int. Cl.
*B65G 19/26* (2006.01)
*B65G 19/22* (2006.01)

(52) U.S. Cl.
CPC .................. *B65G 19/26* (2013.01)

(58) Field of Classification Search
CPC .............................. B65G 19/22; B65G 19/26
USPC ................ 198/727, 728, 729, 730, 731, 732
See application file for complete search history.

(56) References Cited

U.S. PATENT DOCUMENTS

| | | | | |
|---|---|---|---|---|
| 2,091,836 A * | 8/1937 | Sayers | B65G 17/385 | 474/210 |
| 3,103,275 A * | 9/1963 | Rollins | B65G 19/08 | 198/733 |
| 3,111,216 A * | 11/1963 | Geberin | B65G 19/22 | 198/727 |
| 3,641,831 A * | 2/1972 | Palmaer | F16G 13/07 | 474/234 |
| 4,766,995 A * | 8/1988 | Sterwerf, Jr. | B65G 19/08 | 198/733 |
| 5,605,220 A * | 2/1997 | Krohm | B65G 19/22 | 198/727 |
| 5,947,261 A * | 9/1999 | Baker | B65G 19/14 | 198/727 |
| 6,073,752 A * | 6/2000 | Meya | B65G 19/22 | 198/731 |
| 6,142,291 A * | 11/2000 | Schulze | B65G 19/14 | 198/727 |
| 7,036,657 B1 * | 5/2006 | Robinson | B65G 19/08 | 198/728 |
| 8,016,102 B2 * | 9/2011 | Morris | B65G 19/08 | 198/698 |
| 8,978,877 B2 * | 3/2015 | O'Neill | B65G 19/08 | 198/730 |
| 9,227,787 B2 * | 1/2016 | Morris | B65G 19/08 | |
| 9,487,358 B2 * | 11/2016 | Morris | B65G 19/08 | |
| 10,392,193 B2 * | 8/2019 | Walker | B65G 21/12 | |
| 10,414,594 B2 * | 9/2019 | Walker | B65G 19/18 | |

* cited by examiner

*Primary Examiner* — Douglas A Hess
(74) *Attorney, Agent, or Firm* — Kajane McManus; Jeanette M. Braun

(57) ABSTRACT

The forged link and round bottom drag conveyor paddle assembly and method of making same provide for use of a hollow sleeve for engaging link ends together and engaging round bottom drag conveyor paddles to the link through engagement of a suitable connector through the round bottom drag conveyor paddles and the sleeve to make the round bottom drag conveyor paddles easily replaceable. As an alternative embodiment a solid sleeve incorporating threaded ends is also proposed for use in engaging round bottom drag conveyor paddles to a forged link.

13 Claims, 5 Drawing Sheets

ROUND BOTTOM DRAG CONVEYOR PADDLE ASSEMBLY AND METHOD OF MAKING THE SAME

BACKGROUND OF THE INVENTION

The present invention relates to a forged link and round bottom drag conveyor paddle assembly and method of making same. More particularly, an assembly and method for attaching a round bottom drag conveyor paddle to a female end of a forged link are taught which requires no welding on the round bottom drag conveyor paddle and which maintains integrity of the links of the paddle assembly.

PRIOR ART

Heretofore, forged conveying chain was developed in the 1950's to provide a high strength to weight ratio chain for use in conveyors and chain elevators. The links are forged from high strength alloy case hardening steel and then machined to provide an accurately pitched chain.

The links are joined using solid connecting pins manufactured from similar material to the links and are also case hardened.

To act as a conveying link it is necessary to attach round bottom drag conveyor paddles to the links and in virtually every case this is done by welding steel bar to the side of the links.

Because of market demand, the costs incurred with replacing broken round bottom drag conveyor components must be kept to an absolute minimum with respect to weld preparation and conveyor downtime.

Replacing broken round bottom drag conveyor paddles results in the round bottom conveyor assembly not being able to be used while components are replaced, and the current assemblies require weld repairs when broken. The current assemblies are adequate for normal operation but can fail in extreme conditions, such as upon the introduction of tramp into the machine or, indeed, a fatigue failure of one or more welds. There have been many such incidents and the welds are always condemned by welding experts because of welding directly to the case hardened surface and generally inadequate preparation of the round bottom drag conveyor bars. Integrity of the weld can also not be established.

It has also been proposed to weld threaded studs to the inner portion of the female end for fixation of round bottom drag conveyors thereover but, again, integrity of these welds also cannot be established.

The relatively high and increasing cost of welding leads one to the conclusion that an alternative to welding would provide substantial cost savings and substantially improved reliability.

The relatively high and increasing cost of having a round bottom drag conveyor paddle assembly not available for use while components are being repaired further leads one to the conclusion that an alternative to repairs that take a long time to implement would provide substantial cost savings and substantially improved reliability.

Further, welding is a very dangerous process, and an alternative to repairs made by weld would provide substantial cost savings and improve reliability.

SUMMARY OF THE INVENTION

The link and round bottom drag conveyor paddle assembly of the present invention and method of producing same offer a number of advantages, some of which are enumerated hereinbelow.

The requirement to produce structural quality round bottom drag conveyor paddle assemblies that require welding to repair broken components is eliminated, thus removing the need for welding. The cost of welding round bottom drag conveyor paddles to forged links is eliminated. The round bottom drag conveyor paddles can be prefabricated using optimum manufacturing procedures and minimum cost. Round bottom drag conveyor paddles can be reinforced to minimize weight. The forged links and round bottom drag conveyor paddles can be shipped loose, making for much more efficient transport.

In the event of severe round bottom drag conveyor link damage (tramp entering a conveyor) the damaged round bottom drag conveyor paddles can easily be replaced. With the forged link round bottom drag conveyor paddles it is neither necessary to try to bend them straight or cut off the round bottom drag conveyor paddles or to reweld. The forged links and round bottom drag conveyor paddles are fastened together using a bolt, which does not require a weld to replace it. This removes the risk of leaving the assembly in a structurally compromised condition.

Replacing or repairing broken forged links using a bolt instead of welding takes far less time for such repair. In the present disclosure, no welding machines are needed to remove a broken forged link and round drag conveyor paddle assembly.

The present disclosure provides for a forged link and round bottom drag conveyor paddle components that can be put together quickly to form an assembly, and can be quickly disassembled to replace or repair broken components. The replacement and/or repair may be done and controlled by tools comprising a crescent wrench, ratchet driver, or any other type of tool that can remove a bolt from a nut. A torch may also be used to cut the bolt. Any tool that uses heat to slice through a bolt would be considered a torch in the present disclosure.

The present disclosure provides for a forged link and round bottom drag conveyor paddle assembly comprising a bolting assembly to fasten the components of the round bottom drag conveyor paddle together in an assembly. The bolt assembly provides for providing full control over, and less time needed to perform, the connecting and disconnecting of the components. The fast connecting and disconnecting of the components of the assembly can reduce the amount of time the conveyor assembly is unavailable for use while being repaired or assembled.

The cost of the sleeve and fasteners proposed for use herein is comparable to the double circlip and pin arrangement and is less than the headed types.

Failure of circlips is not unknown and can cause serious damage when the connecting pin comes out. The method of the present invention would substantially eliminate this mode of failure.

Because the solid connecting pins used in the vast majority of conveyors are substantially stronger than necessary it has been concluded that they can be replaced by a hollow sleeve with a thinner connector extending therethrough, which can be used to engage a round bottom drag conveyor paddle to a forged link without prejudicing the strength of the chain. This means that the round bottom drag conveyor paddles, sleeves and connectors can be prefabricated and easily engaged, without welding of the round bottom drag conveyors to the links during assembly or disassembly of the conveyor round bottom drag paddle apparatus.

Forged conveyor chains presently in use can also be retrofit with the forged link and round bottom drag conveyor paddle assembly of the present disclosure using the method disclosed hereinbelow. Also, round bottom drag conveyor paddles, damaged or otherwise, can be installed and reinstalled with the forged links maintained connected such that no disassembly or reassembly of the portion of the assembly not requiring repair or replacement would be required using the method herein disclosed.

DESCRIPTION OF THE PREFERRED EMBODIMENTS

Figure 1:
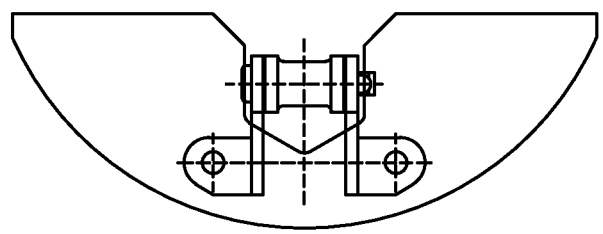
FIGS. 1, 2, and 3 disclose various views of a prior art embodiment of a roller link and paddle assembly.
Figure 2:
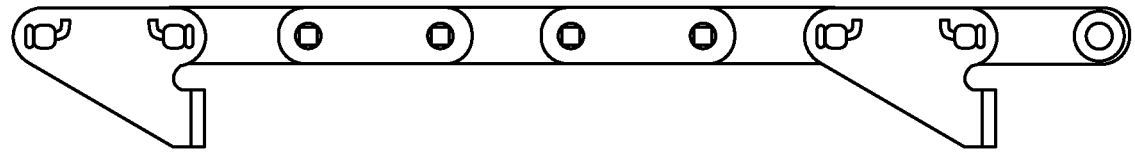
Figure 3:
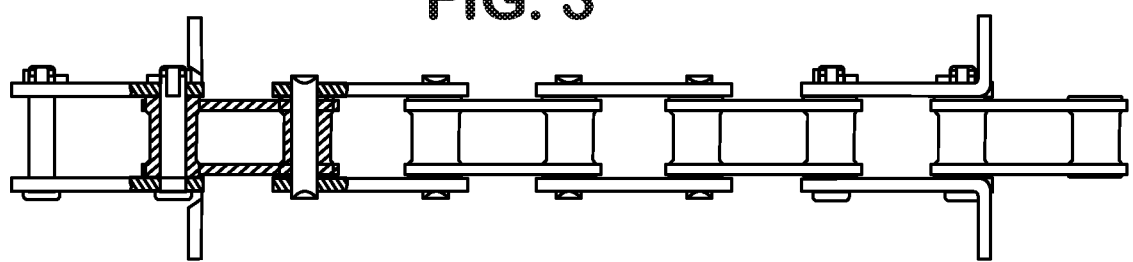

Referring now to the drawings in greater detail, FIGS. 1, 2, and 3 show different views of a prior art plate link chain incorporating a round bottom drag conveyor flight engaged across the entire length of a plate link. Such engagement cannot be used with a forged link because the links must be able to pivot relative to one another.

Figure 4:
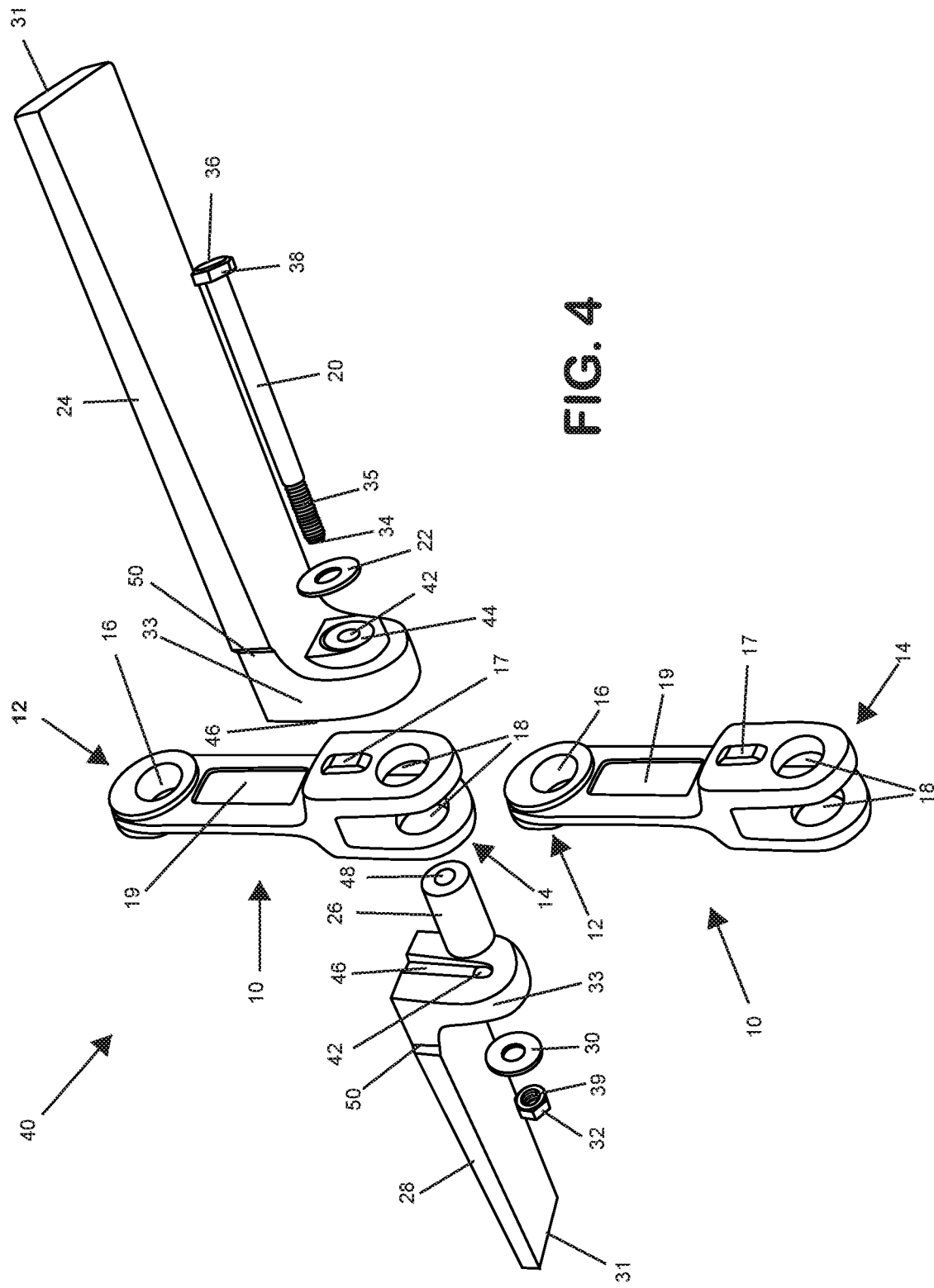
FIG. 4 is a perspective view of disassembled components of the forged link portion of the round bottom drag conveyor paddle assembly.

FIG. 4 illustrates is a perspective view of disassembled components of the forged link portion of the flat bottom drag conveyor paddle assembly. The forged link is generally identified by reference numeral 10 and is shown to have a male end 12 and a female end 14. The female end 14 of one link 10 pivotably engages a male end 12 of an adjacent link 10, with male end 12 incorporating a bore 16 and female end 14 comprising a lug 17 on each side of the female end 14 and having a cooperating throughbore 18 extending therethrough, by means of which, using a fastener assembly comprising a bolt 20, optionally a first washer 22, a first attachment sidebar 24, a hollow pin 26, a second attachment sidebar 28, optionally a second washer 30, and a nut 32, that pivotably engages at least two links 10 together. The at least two links 10 are engaged pivotably relative to each other, to form a link and paddle assembly. Optionally, each link 10 may have a cutout 19. The cutout 19 may allow air to flow through the link 10, creating less drag, and remove weight from the link 10.

The bolt 20 having an open end 34 comprising a threaded shank 35 and a head end 36 comprising a surface edge 38 that allows for a tool (not shown) to engage with the bolt 20 to tighten it or remove it from the forge link assembly 40.

The nut 32 can be a lock nut. The nut 32 comprises an inner portion with threading 40 that provides for biting engagement with threaded shank 35 on bolt 20.

If desired or necessary, an optional antirotation device, such as a dovetail joint, can also be incorporated into the forged link assembly 40.

In a preferred embodiment, as shown, the antirotation or positioning or dovetail joint can be comprised of a pin, lug, or nub 17 suitably attached to the outer side surface of the female end 14, which cooperates with a slot or elongated ovaled cutout tail 46 formed in the base 33 of the first attachment sidebar 24 and/or second attachment sidebar 28, such that, when the first attachment sidebar 24 and/or second attachment sidebar 28 is tightened onto the female end 14 of the link 10, the slot or elongated ovaled cutout tail 46 engages or seats upon the pin or nub 17, to keep the first attachment sidebar 24 and/or second attachment sidebar 28 from twisting out of position relative to the link 10.

A first attachment sidebar 24 comprises an outer end 31 including a counter sunk bore 42 surrounding area 44, and a cooperating elongated ovaled cutout tail 46 (not shown) in the base end 33 thereof.

A second attachment sidebar 28 comprises an outer end 31 end including a counter sunk bore 42, surrounding area 44 (not shown), and a cooperating elongated ovaled cutout tail 46 in the base end 33 thereof.

The first attachment sidebar 24 and second attachment sidebar 28, in this embodiment, are both planar. To add strength to the first attachment sidebar 24 and/or second attachment sidebar 28, an optional metal reinforcement (not shown) which nests within the curved portion and extends along the base and a portion of the body of the first attachment sidebar 24 and second attachment sidebar 28 may be provided.

In one embodiment, engagement of the first attachment sidebar 24 and/or second attachment sidebar 28 to the link 10 here is made in a manner identical to that described above, with the bolt 20 passing through the first attachment sidebar 24 and/or second attachment sidebar 28 and metal reinforcement (not shown), if present.

In one embodiment, the first attachment sidebar 24 and/or the second attachment sidebar 28 incorporate a notch 50 therein, adjacent the base end 33 of each. This notch 50 can be provided in the first attachment sidebar 24 and/or the second attachment sidebar, made of metal, plastic, or other suitable material, when centered guide rails (not shown) are present in the conveying (not shown) mechanism with which the forged link assembly 40 is used.

It will be understood that the configuration of the notch 50 in any embodiment of a forged link assembly 40 can be configured to accommodate any of the various embodiments of guide rails known to those skilled in the art. Thus the forged link assembly 40 of the present disclosure and method of making same provide assemblies 40 which can be considered universal, and adaptable to being retrofit in virtually every environment.

Thus, the forged link assembly 40 is seen to be one which allows for ease in replacement of damaged components quickly and without need of welding or extraneous holes in the link 10, and lends itself nicely to being capable of being retrofit.

Figure 5:
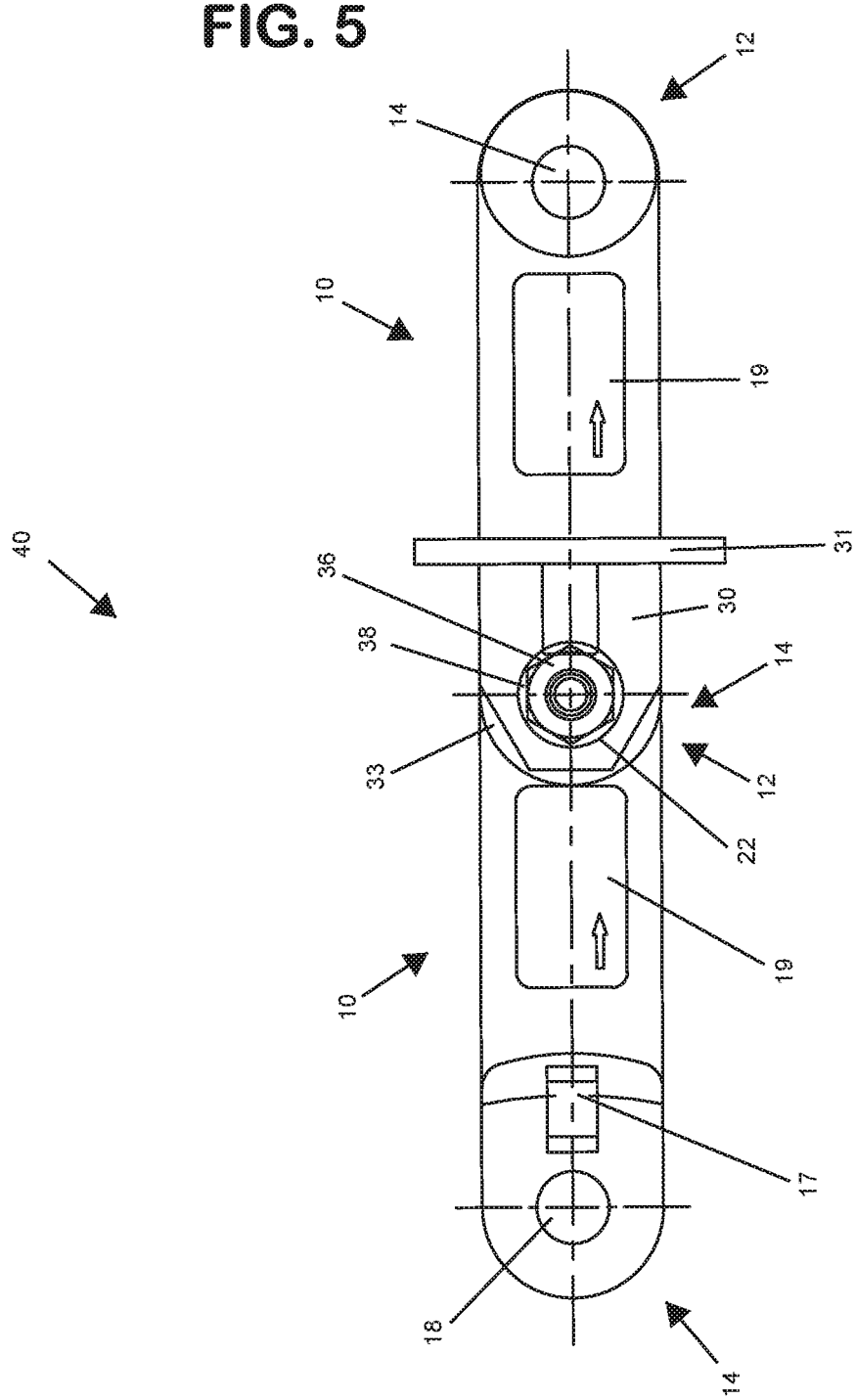
FIG. 5 illustrates a side view of the forged link and round bottom drag conveyor paddle assembly in its assembled form.

Turning now to FIG. 5, there is illustrated therein the side view of an assembled forged link assembly 40, in accordance with the method and structure of the present invention.

In one embodiment, the first attachment sidebar 30 configuration has a rearward, downward and outward slant relative to an outer end edge 31 and a base 33. This preferred configuration strengthens the first attachment sidebar of the forged link assembly 40, though this should not be construed as limiting.

The base end 33 preferably includes a counter sunk bore 42 (not shown) and surrounding area 44 (not shown), and a cooperating ovaled cutout tail 46 (not shown) therein. The male end of one forged link 10 is fastened to the female end of a second link 10, the lug 17 (see FIG. 4) of the forged link 10 interlocks with the cooperating ovaled cutout tail 46 (see FIG. 4), creating a dovetail joint once bolt 20 is tightened to the preferred torque, as will be described in greater detail below, though this should not be construed as limiting.

Seated within the throughbore 18 in the female end 14 of the link 10, is a hollow sleeve or pin 26 (see FIG. 4) which has a length slightly shorter than the distance between the outer side surfaces of the female end 14. This slight shortening in the length of the hollow pin 26 is to prevent binding of the hollow pin 26 to first attachment sidebar 24 and second attachment sidebar 28 when they are tightened down against the outer side surfaces of the female end 14.

Once the hollow sleeve 26 is positioned within the throughbore 18 in the female end 14 of one link 10 and through the aligned cooperating bore 16 in the male end 12 of an adjacent link 10, the first attachment side bar 24 and second attachment sidebar 28 are positioned adjacent the outer side surfaces of the female end 14 and create a fastening assembly to secure the base ends 33 of the first attachment side bar 24 and second attachment sidebar 28 against the link 10.

In one embodiment, the fastening assembly comprises an elongate bolt 20 and nut 32, as shown in FIG. 4. In another embodiment, the fastening assembly also comprises a first washer 22 and a second washer 30. In another embodiment, it has been proposed that an interior surface 48 of the hollow sleeve 26 can be threaded to receive a bolt 20, which can be a locking bolt, into each end thereof (not shown), while in another embodiment, it is proposed that a solid shaft with threaded ends (not shown) and nut 32, which can be a locking nut, can be used as components of the fastener assembly. Thus, any form of suitable fastener assembly components which can accomplish the goal of engaging cooperating ends of adjacent links 10 and a first attachment side bar 24 and a second attachment sidebar 28 together in a manner allowing the links 10 to pivot as required will be construed as suitable for use in the forged link assembly 40.

In one embodiment, the cutout 19 of the forged link 10 can provided to allow for introduction of a suitable tool (not shown) for fixing the forged link assembly 40 in a suitable manner. It can also be provided to reduce air drag as the forged link assembly 40 is in motion. If can further be provided to reduce the weight of the forged link assembly 40.

In one embodiment, the first attachment sidebar 24 or second attachment sidebar 28 does not require the provision of the end including a counter sunk bore 42 in the base 33, which, however, is at present, the preferred embodiment, inasmuch as counter sinking of the bore 42 is not required.

In one embodiment the first attachment sidebar 24 and/or second attachment sidebar 28 are made of metal. One preferred metal, because it is fairly inexpensive to use, is pressed steel, though this is not to be construed as limiting.

Figure 6:
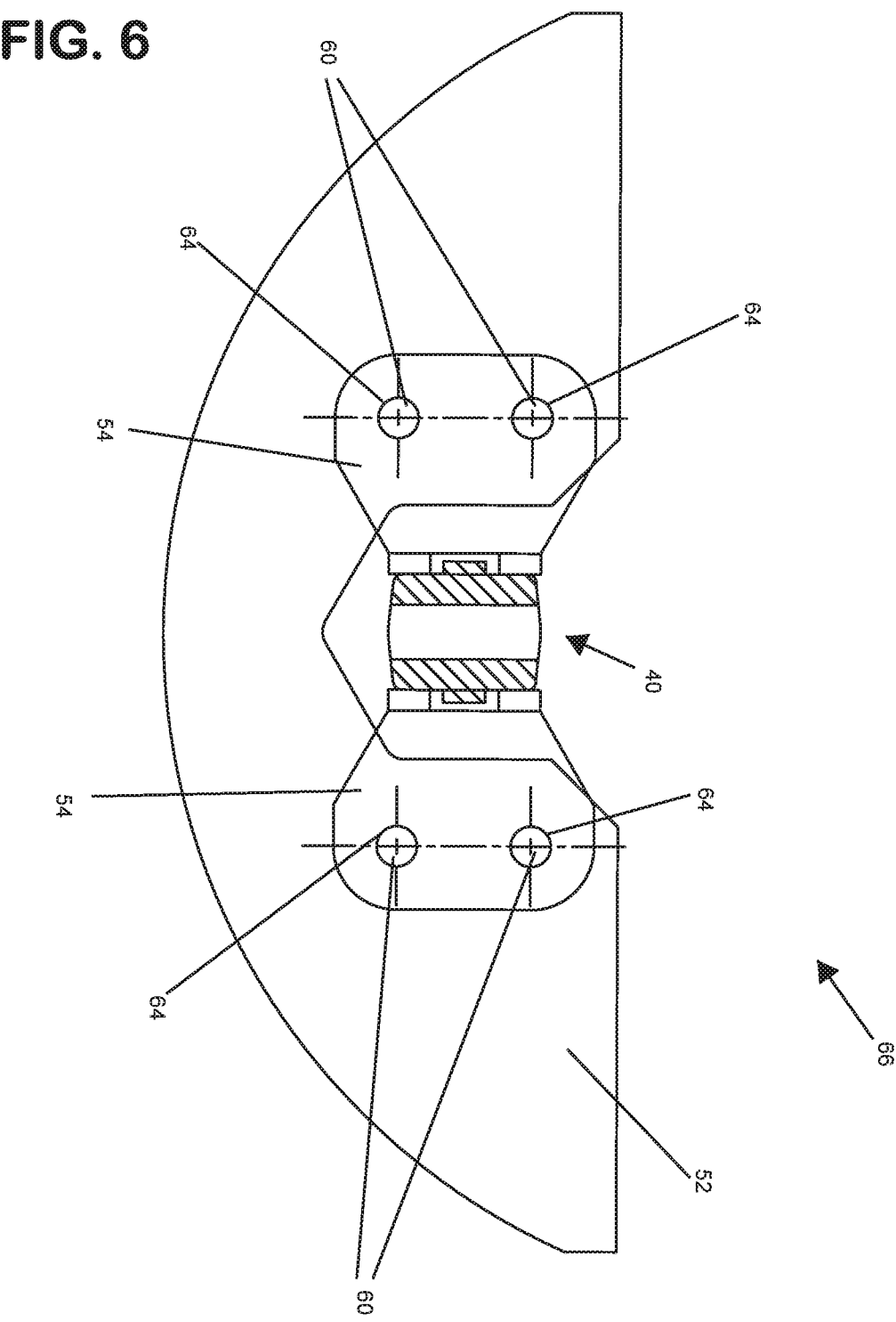
FIG. 6 illustrates a front bottom plan view of a rounded bottom drag conveyor paddle assembly.

Turning now to FIG. 6, a bottom plan view is illustrated that shows a further embodiment of the forged link assembly 40 including a round bottom paddle 52 and a round bottom fastening assembly. The round bottom fastening assembly can comprise a first paddle bracket 54 that may be L-shaped, a second paddle bracket 56 that may be L-shaped, at least one paddle nut 58 (see FIG. 7), at least one paddle bolt 60 (see FIG. 7), and optionally, at least one paddle washer 62 (see FIG. 7).

Figure 7:
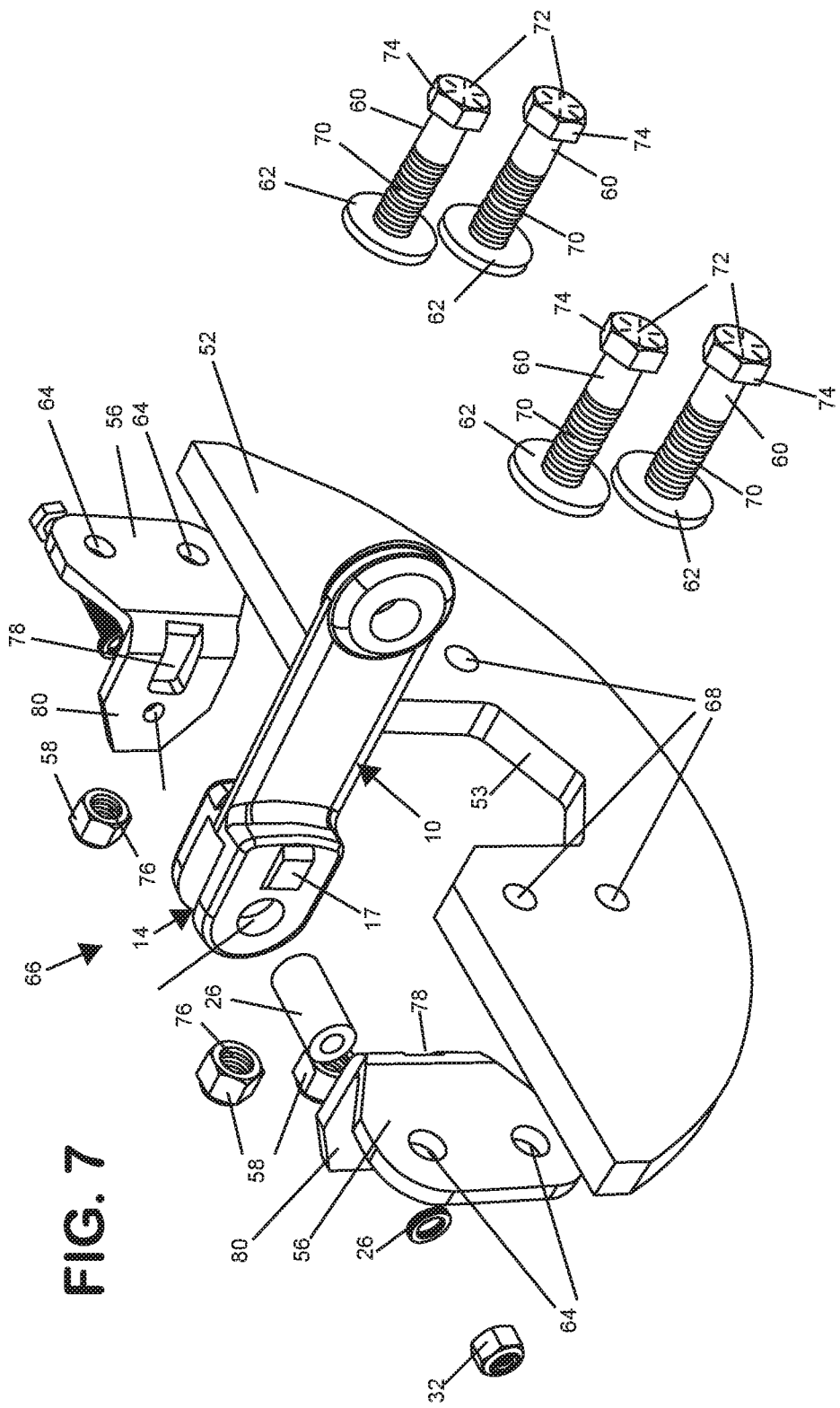
FIG. 7 is a perspective view of the disassembled components of the forged link, round bottom drag conveyor paddle assembly, and fastener components of a round bottom drag conveyor paddle assembly.

Turning to FIG. 7, illustrated therein is a perspective view of the disassembled components of a round bottom drag conveyor paddle assembly 66, comprising a forged link 10, forged link fastening assembly, a round bottom paddle 52 and a round bottom fastening assembly.

In one embodiment, the first paddle bracket 54 that may be L-shaped and second paddle bracket 56 that may be L-shaped incorporate at least one bore 64, by means of which, using the forged link fastening assembly that solidly engages a forged link assembly 40 to the round bottom paddle 52. The round bottom paddle 52 also incorporates at least one throughbore 68 extending therethrough, which allows for the round bottom fastening assembly to engage the round bottom paddle 52 to the paddle brackets 54, 56.

Engaging the round bottom paddle 52 to the forged link assembly 40 provides for the round bottom drag conveyor paddle assembly 64. The round bottom paddle 52 incorporates a notch 53 that allows the forged link assembly to protrude through without restriction of movement. The paddle bolt 60 comprises a threaded shank 70 and a head end 72 comprising a surface edge 74 that allows for a tool (not shown) to engage with the paddle bolt 60 to tighten it or remove it from the round bottom paddle 54.

The nut 58, similar to the forged link assembly 10 nut 32, can be a lock nut. The nut 58 can engage an inner portion with threading 76 that provides for biting engagement with threaded shank 70 on paddle bolt 60.

If desired or necessary, an optional antirotation device, such as a dovetail joint, similar to the dovetail joint provided in the forged link assembly 40, can also be incorporated into the round bottom drag conveyor paddle assembly 66.

In a preferred embodiment, as shown, the antirotation or positioning or dovetail joint can be comprised of a pin, lug, or nub 17 suitably attached to the outer side surface of the female end 14 of the forged link 10, which cooperates with a slot or elongated ovaled cutout tail 78 formed in the base 80 of brackets 54, 56, such that, when the either or both of brackets 54, 56 are tightened onto the female end 14 of the link 10, the slot or elongated ovaled cutout tail 78 engages or seats upon the pin or nub 17, to keep brackets 54, 56 from twisting out of position relative to the link 10.

Also in this embodiment, the positioning device or dovetail joint comprise a tab 50 which extends from the base 24 of the round bottom drag conveyor 20, and in the illustrated embodiment, rests against and extends along an outer (top) surface 60 of the female end 14 of a link 10 to which it is engaged. The tab 50 is at position on the round bottom drag conveyor 20 opposite to that at which the notch 44 is located, so, again, as not to interfere if guide rails need to be accommodated for.

It will be understood that all embodiments of the forged link assembly 40 and round bottom drag conveyor paddle assembly 66 are merely exemplary and should not be construed as set in stone, or limiting to the inventions disclosed herein.

As described above the forged link assembly 40 and the round bottom drag conveyor paddle assembly 66, which incorporates the forged link assembly 40, of the present disclosure, in combination with the method of creating the round bottom drag conveyor paddle assembly 66, provide a number of advantages, some of which have been described above and others of which are inherent in the invention. Also, modifications to either the forged link assembly 40 or the round bottom drag conveyor paddle assembly 66 which incorporates the forged link assembly 40 and method of creating same can be proposed without departing from the teachings herein. As an example, two bolts, rather than a throughbolt could be used in any fastening system for either assembly herein. Accordingly, the scope of the invention is only to be limited as necessitated by the accompanying claims.

I claim:

1. A forged link and round bottom drag conveyor paddle assembly comprising a forged link having a male end and a female end, each of which cooperates with an opposite end of an adjacent link to form a link and paddle assembly, each end having a throughbore therein which cooperates with a throughbore in the opposite end of an adjacent link to form a bore for receiving a connector therein for creating a round bottom drag conveyor paddle assembly wherein the links pivot relative to each other, the connector being configured in the form of a hollow sleeve extending through substantially an entire length of the bore, a separate round bottom drag conveyor paddle which is tightenable against each lateral side of the female end of a link with a nut and elongate bolt, the elongate bolt extending through a bore in each round bottom drag conveyor and the hollow sleeve which joins the links together.

2. The assembly of claim 1 wherein the round bottom drag conveyor paddle includes a base having said bore therein and a body portion which extends laterally away from the base and the link.

3. The assembly of claim 2 wherein the round bottom drag conveyor paddle is plastic.

4. The assembly of claim 2 wherein the round bottom drag conveyor paddle is metal.

5. The assembly of claim 2 wherein a reinforcement is nested within a curved area between the base and the body of the round bottom drag conveyor paddle.

6. The assembly of claim 5 wherein the reinforcement has a bore therein which aligns with the bore in the base of the round bottom drag conveyor paddle.

7. The assembly of claim 6 wherein said bolt extends through the base of the reinforcement and round bottom drag conveyor paddle and the hollow sleeve therebetween, the bolt receiving said nut on one end thereof, said nut being a locking nut.

8. The assembly of claim 1 including a positioning device for keeping each round bottom drag conveyor paddle in appropriate position relative to the link.

9. The assembly of claim 8 wherein the positioning device comprises a pin fixed to a lateral surface of the female end of the link, the pin engaging within a slot provided in the base of the round bottom drag conveyor paddle.

10. A method for producing a forged link and round bottom drag conveyor paddle assembly comprising a forged link having a male end and a female end each of which cooperates with an opposite end of an adjacent link to form a link and paddle assembly, each end having a throughbore therein which cooperates with a throughbore in the opposite end of an adjacent link to form a bore for receiving a connector therein for creating a forged link and paddle assembly wherein the links pivot relative to each other, the improvement comprising engaging a round bottom drag conveyor paddle to each lateral side of the female end of a link using a nut and elongate bolt which extend through the connector which joins the links together, the method including the steps of: engaging a male end of a link with a female end of an adjacent link; placing a connector into aligned bores of the engaged link ends; positioning a round bottom drag conveyor over each lateral side of the female end of the link; and tightening down the round bottom drag conveyor paddles against the engaged links using a nut and elongate bolt, the elongate bolt extending through a bore in each round bottom drag conveyor paddle and the connector.

11. The method of claim 10 further including aligning a slot in each round bottom drag conveyor paddle over an alignment pin if such is provided on the link.

12. The method of claim 10 wherein a strengthening device for a round bottom drag conveyor paddle is also engaged to the links by the nut and elongate bolt.

13. A forged link and round bottom drag conveyor paddle assembly comprising a forged link having a male end and a female end each of which cooperates with an opposite end of an adjacent link to form a link and paddle assembly, each end having a throughbore therein which cooperates with a throughbore in the opposite end of an adjacent link to form a bore for receiving a connector therein for creating a forged link and paddle assembly wherein the links pivot relative to each other, the improvement comprising engaging a separate round bottom drag conveyor to each lateral side of the female end of a link using the connector which joins the links together, the connector comprising a hollow sleeve which seats within the bore and has a threaded interior and receives a bolt into each end thereof, the bolt passing through a respective round bottom drag conveyor paddle to one side of the female end and extending into the sleeve.

\* \* \* \* \*